United States Patent
Nakamura

(10) Patent No.: US 7,442,331 B2
(45) Date of Patent: Oct. 28, 2008

(54) FILM CASTING METHOD

(75) Inventor: Toshikazu Nakamura, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 113 days.

(21) Appl. No.: 11/648,781

(22) Filed: Jan. 3, 2007

(65) Prior Publication Data
US 2007/0108653 A1    May 17, 2007

Related U.S. Application Data

(62) Division of application No. 10/936,570, filed on Sep. 9, 2004, now Pat. No. 7,186,107.

(30) Foreign Application Priority Data

Sep. 11, 2003    (JP) .............................. 2003-320272

(51) Int. Cl.
*B29C 47/08* (2006.01)
(52) U.S. Cl. ...................... 264/40.1; 264/102; 264/169; 264/212; 264/216
(58) Field of Classification Search ............... 264/40.1, 264/102, 169, 212, 216
See application file for complete search history.

(56) References Cited

U.S. PATENT DOCUMENTS

| | | | |
|---|---|---|---|
| 6,767,500 | B2 | 7/2004 | Yamazaki et al. |
| 6,887,415 | B2 | 5/2005 | Yamazaki et al. |

FOREIGN PATENT DOCUMENTS

| | | |
|---|---|---|
| JP | 8-244053 A | 9/1996 |
| JP | 2000-317961 A | 11/2000 |

*Primary Examiner*—James Mackey
(74) *Attorney, Agent, or Firm*—Birch, Stewart, Kolasch & Birch, LLP

(57) ABSTRACT

A pipe for supplying a dope to a co-casting die consists of a goose neck portion connected to a feed block of the co-casting die, and a straight pipe portion connected to the goose neck portion. The goose neck portion has a radius of curvature of 50 mm to 400 mm, and the straight pipe portion forms an angle of 0 to 20 degrees to the horizontal plane. Venting valves are opened up at the beginning of dope feeding, and are closed to some extent as the dope comes out. After the air is completely vented out, the venting valves are completely closed. Thereby, an air collection is completely let out from the pipe, a plastic web discharged from die lips of the co-casting die would not contain any air bubbles, it is prevented that the web splashes to put on the die lips, causing streaks on the produced film.

4 Claims, 2 Drawing Sheets

FILM CASTING METHOD

This application is a Divisional of application Ser. No. 10/936,570 filed on Sep. 9, 2004, now U.S. Pat. No. 7,186,107, and for which priority is claimed under 35 U.S.C. § 120; and this application claims priority of Application No. 2003-320272 filed in Japan on Sep. 11, 2003 under 35 U.S.C. § 119; the entire contents of all are hereby incorporated by the reference.

FIELD OF THE INVENTION

The present invention relates to a film casting apparatus for forming plastic film by casting, the plastic film being suitable for optical applications. The present invention relates also to a protective film of a polarizing plate, and the polarizing plate using the protective film that is formed by use of the film casing apparatus of the invention.

BACKGROUND ARTS

In recent years, there is an increasing demand for transparent plastic or resin film for optical applications, especially for high-quality protection film of polarizing plates for liquid crystal display devices. For the manufacture of such a plastic film, an apparatus using a solution film-forming method is suitable.

The solution film-forming method uses a solution called dope, which is made by dissolving material flakes with a solvent and adding some additive agents according to the needs, such as plasticizers, UV-absorbers, antidegradants, slipping agents, and a release accelerator. The solution film-forming method includes the steps of casting the dope from a dope supply device, called a casting die, on a support that is constituted of a horizontal endless metal band or a rotary drum, drying the dope on the support to some extent till it gets rigid to be a solidified film, peeling the solidified film off the support, and removing the solvent from the film while conveying it through a drying section.

On the other hand, in order to develop industrial production of plastic films, it is important to improve their productivity. To improve productivity, it is necessary to automatize as many manufacturing processes as possible. Especially for embodying a solution film-forming method of manufacturing plastic film, there is a large need for automatizing a casting apparatus, also because it will prevent discharging organic solvent into the environment and polluting the environment. Such an automatic casting apparatus is disclosed for example in Japanese Laid-open Patent Application No. Hei 8-244053.

However, the solution film-forming method of manufacturing plastic film or resin film can suffer from a trouble that is caused by the air contained in the dope. That is, when the dope is initially fed to the casting die at the start of operation, the air collects in the leading stream of the dope, and often forms bubbles. If the dope containing the bubbles is cast on the support for the film-forming, the resin solution or dope will splash and stick to die lips. This will result in forming undesirable streaks on the products.

To solve this problem, the present applicant has invented an apparatus for feeding the dope free from the air to the casting die, and filed a Patent application for this apparatus, as Japanese Laid-open Patent Application No. 2000-317961. This apparatus is provided with a second pipe or a dope tapping pipe in addition to a dope supply pipe for a casting die, in the vicinity of a dope entrance of the casting die. The flow of the dope may be switched over between the dope supply pipe and the dope tapping pipe, so that an initial flow of the dope, as containing the air, is conducted into the dope tapping pipe. Thereafter, the air-free dope is conduced through the dope supply pipe to the casting die.

However, it has been found that the apparatus disclosed in Japanese Laid-open Patent Application No. 2000-317961 cannot completely vent the air that collects in the dope supply pipe, so that it is difficult to automatize the starting process of the solution film-forming.

SUMMARY OF THE INVENTION

In view of the foregoing, a primary object of the present invention is to provide a film casting apparatus that prevents the discharged dope from containing air bubbles, which may be caused by the air collecting in the dope supply pipe.

Another object of the present invention is to provide a protective film for a polarizing plate, which is manufactured by the apparatus of the invention, and a polarizing plate using the protective film.

To achieve the above and other objects, the present invention provides a film casting apparatus for forming a plastic film by casting a resin solution from a casting die onto a support, the film casting apparatus comprises a solution supply pipe for supplying the resin solution continuously to the casting die, The solution supply pipe comprising a goose neck portion connected to the casting die and having a radius of curvature of 50 mm to 400 mm, and a straight pipe portion connected to the goose neck portion, the straight pipe portion forming an angle of 0 to 20 degrees relative to a horizontal plane.

According to a preferred embodiment, the goose neck portion or the straight pipe portion is provided with at least an air vent valve.

According to another preferred embodiment, the goose neck portion or the straight pipe portion is provided with at least an air bubble sensor.

The resin solution is preferably a cellulose ester solution.

According to the present invention, a protective film for a polarizing plate is manufactured by the film casting apparatus of the present invention.

A polarizing plate of the present invention uses the protective film manufactured by the film casting apparatus of the present invention.

It is preferable that the viscosity of the resin solution is in a range from 30 to 3000 P (Poise), at a measuring temperature of 35° C. and that the average speed of the flow of the dope through the solution supply pipe is in a range from 1 to 30 m/min. at the beginning of feeding.

According to the film casting apparatus of the present invention, the casting di e is connected to the goose neck portion having a radius of curvature of 50 mm to 400 mm, and the goose neck portion is connected to the straight pipe portion that forms an angle of 0 to 20 degrees to the horizontal plane. This configuration promotes letting air bubbles out of the pipe, so that the air will hardly collect in the pipe. Therefore, the present invention prevents mixture of air bubbles into the resin solution.

As the goose neck portion or the straight pipe portion is provided with the air vent valve, the air bubbles can be vent out before they enter the casting die. So the air collection will not be formed inside the casting die.

Since the resin solution or dope is prevented from containing air bubbles when it is extruded from the die lips of the casting die onto the support, the dope will not splash to put on the die lips, so the product will not get streaks that may otherwise be caused by the dope stuck to the die lips.

Providing the solution supply pipe with an air bubble sensor makes it possible to monitor the air collection in the pipe, and control the air vent valve depending upon the monitoring results. Then it becomes easy to start the film-forming process automatically. As a result, the productivity of the plastic film is remarkably improved.

Using the cellulose ester solution as the dope contributes to producing a streak-free high-quality optical application film. The plastic film casting apparatus of the present invention can produce a high quality protective film for a polarizing plate, and a high quality polarizing plate using the protective film manufactured by the apparatus of the invention.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

As resin raw materials of a plastic web or film by to form by the casting apparatus of the present invention, following examples can be recited: lower fatty acid esters of cellulose, polyolefins (for example, norbornene polymer), polyamides (for example, aromatic polyamide), polysulfides, polyethers (including polyether sulfide, polyether ketone), polystyrenes, polycarbonates, polyacrylates, polyacrylamides, polymethacrylic acids (for example, polymethyl methacrylate), polymethacrylic amides, polyvinyl alcohols, polyureas, polyesters, polyurethanes, polyimides, polyvinyl acetates, polyvinyl acetals (for example, polyvinyl formal, polyvinyl butyral) and proteins (for example, gelatin).

Among these materials, lower fatty acid esters of cellulose are preferable as the film material for optical applications, and cellulose triacetate is the most preferable.

The resin materials are dissolved into appropriate organic solvent to prepare at least two kinds of resin solutions, hereinafter called the dopes. The organic solvent can be halogenated hydrocarbons (such as dichloromethane), alcohols (such as methanol, ethanol, butanol), esters (such as methyl formate, methyl acetate), and ethers (such as dioxane, dioxolan, diethyl ether).

The cellulose ester solution may be added with many kinds of known plasticizers, such as triphenyl phosphate, diethyl phthalate, and polyester polyurethane elastomer. According to the need, well-known additives such as UV-absorbers, antidegradants, slipping agent, peeling accelerator may also be added to the solution.

To prepare the dope, the raw material resins and other components may be mixed and dissolved into the solvent according to a well-known method. Alternatively, a cool dissolving method is usable, wherein the raw material resins and other components are swelled in the solvent, and the swelled mixture is cooled down below −10° C. and is then heated up above 0° C. for dissolving.

The viscosity of the dope is normally in a range from 30 to 3000 P (Poise), at a measuring temperature of 35° C., and the average speed of the flow of the dope through the dope supply pipe is preferably in a range from 1 to 30 m/min. at the beginning of feeding. The dope is cast by use of a film casting apparatus 10 as shown in FIG. 1.

Figure 1:
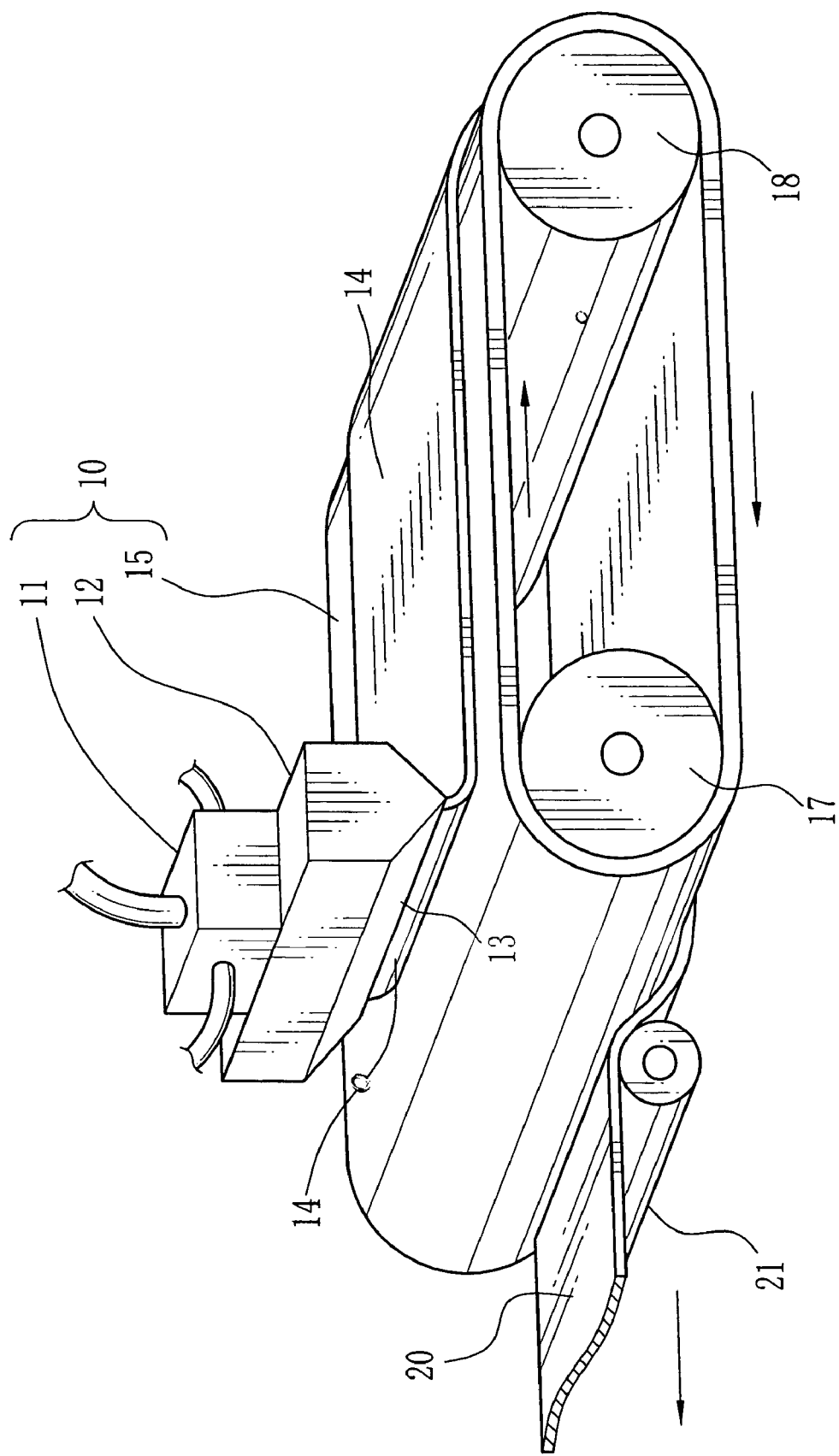
FIG. 1 is a perspective schematic diagram illustrating a film casting apparatus according to an embodiment of the present invention.

In FIG. 1, the film casting apparatus 10 is constituted of a co-casting die 12 having a feed block type resin solution gathering device, here in after called briefly the feed block, 11, and a casting belt 15, which moves continuously below die lips 13 of the co-casting die 12, and serves as a support for supporting a multi-layered web 14 as it is discharged from the die lips 13. The casting belt 15 is an endless belt that is suspended between a pair of rollers 17 and 18, and is made of stainless steal. As the roller 17 is driven to rotate, the casting belt 15 circulates endlessly between the rollers 17 and 18.

On the casting belt 15, the multi-layered web 14 is gradually solidified into a sheet of film 20 as the solvent gradually vaporizes from the web 14. The film 20 is peeled off the casting belt 15 by use of a peeling roller 21, and is fed to a not-shown drying device. After being dried, the film 20 is wound into a roll by use of a not-shown winder. It is to be noted that the casting belt 15 is just an example, and any other known device is usable for drying the multi-layered web 14.

The feed block 11 has a well-known structure, wherein there are a central passageway and side passageways on opposite sides of the central passageway. The central passageway is feeding a dope for forming an intermediate layer. The side passageways are feeding a dope for forming an obverse surface layer and a dope for forming a back layer are fed onto the opposite sides of the flow of the dope from the central passageway.

Figure 2:
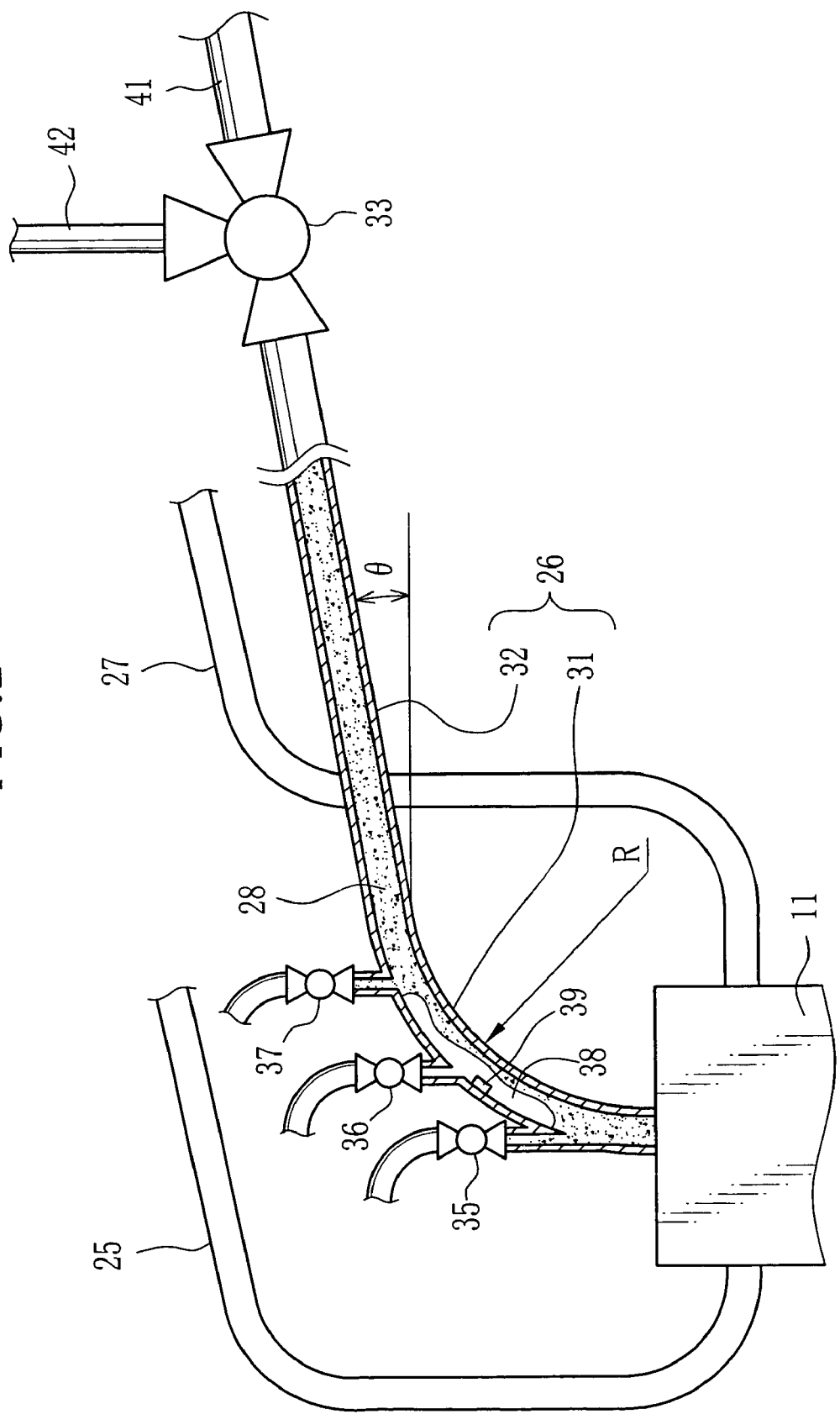
FIG. 2 is an explanatory diagram illustrating solution supply pipes of the film casting apparatus of the present invention.

As shown in FIG. 2, the feed block 11 is connected to three pipes 25, 26 and 27 to supply the feed block 11 with the three kinds of dopes for forming the obverse, intermediate and reverse layers respectively. The pipe 26, which is for feeding the dope 28 for the intermediate layer, consists of a goose neck portion 31 coupled to the feed block 11, and a straight pipe portion 32 extending between the goose neck portion 31 and a three-way valve 33.

The goose neck portion 31 has a radius of curvature R in a range from 50 mm to 400 mm, and more preferably from 50 mm to 200 mm. The goose neck portion 31 is provided with three air vent valves 35, 36 and 37. The straight pipe portion 32 is inclined to a horizontal surface by an angle $\theta$ of 0 to 20 degrees. The length of the straight pipe portion 32 is about 0.5 to 3 m, but it may be defined appropriately. It is found that air collection 38 in the pipe 26 is prevented by defining the radius of curvature R of the goose neck portion 31 and the inclination angle $\theta$ of the straight portion 32 in the above mentioned ranges.

The three-way valve 33 is connected to, besides the straight pipe portion 32, a pipe 41 for feeding the dope 28 from a not-shown dope supply source, and a feed back pipe 42 for feeding the dope 28 from the pipe 41 back to the dope supply source, for example, when to interrupt the film casting apparatus 10. The straight pipe portion 32 may partly be a flexible hose, or may partly include a goose neck portion.

The film casting apparatus 10 configured as above opens the air vent valves 35 to 37 at the beginning of dope feeding, and closes the air vent valves 35 to 37 to some extent as the dope 28 comes out. After the air completely goes out through the air vent valves 35 to 37, the air vent valves 35 to 37 are completely closed. This way, the air collection 38 is completely vent out from the pipe 26 before the dope 28 flows into the feed block 11. So the multi-layered web 14 as ejected from the die lips 13 would not contain any air bubbles. Therefore, the multi-layered web 14 would not splash to put on the die lips 13. So the film 20 would not suffer the streaks that could be caused by the air bubbles in the web 14.

Disposing a bubble sensor 39, for example, an infrared transmissive or reflective sensor, in the vicinity of the air vent valves 35 to 37 is preferable for the sake of automatic control of opening and closing the air vent valves 35 to 37. Then it is possible to automatize the activation of the film-forming process. It is also possible to provide an air vent valve in a part of the straight pipe portion 32.

In the above embodiment, the pipe 26 is provided with three air vent valves. The number of air vent valves is preferably not more than three, because the air vent valve may cause a malfunction when the dope stays in between the air vent valve and the dope supply pipe. For the same reason, it is desirable that the air vent valve has a valve structure with fewer portions allowing the dope to stay there.

Although the present embodiment has been described with respect to the pipe 26 for the intermediate layer, other pipes 25 and 27 may have the same structure as the pipe 26, and may be provided with at most three air vent valves each. So the same applies to any of the three pipes 25 to 27.

The casting belt may be replaced with a cooling rotary drum or any other known device that serves as a support for the multi-layered web in the manufacturing process for a multi-layered film.

Insofar as it is the feed block type, any kind of dope gathering device may be used for continuously gathering the different kinds of dope to form a multi-layered film. The co-casting die may have an appropriate internal structure. For example, the co-casting die may be a coat hanger die or a T die.

Although the present invention has been described with respect to the embodiment where the co-casting die is used for forming three layers of solution flow, the present invention is applicable to a casting die for casting a single-layer web.

The film 20 to be produced by the film casting apparatus of the present invention preferably has a thickness of 30 to 200 μm, though it varies depending upon the raw material and the application of the film. The film produced by the film casting apparatus of the present invention is usable as a protective film of a polarizing plate, or a film base for photographic film. The polarizing plate may be formed by putting the protective film on either side of a polarizing web that is formed from polyvinyl alcohol or the like.

The film may also be applicable to other kinds of optical function film, such as an optical compensation film that is formed by bonding an optical compensation sheet on the film, or as an antireflection film that is formed by laminating a glare protection layer on the film. These articles may be used as a part of a liquid crystal display device.

It is preferable to set the flow of the dope through the supply pipe at a greater value than necessary for achieving an expected thickness of the film, before the dope is discharged from the casting die. When the dope begins to go out from the casting die, the flow is reduced to a value that will achieve the expected thickness, and is maintained at this value while the dope is being discharged. This method is effective especially in the co-casting using a feed block, though it is also effective for casting a single-layer web.

If the flow of the dope is lower than the necessary value for the expected thickness, the preventive effect against the air bubble formation will be reduced. If, on the contrary, the flow of the dope is greater than the necessary value for the expected thickness during the discharging, it becomes difficult to peel the plastic film completely off the support, so the remaining film may spoil the support. The support may be an endless belt or a drum.

If the expected thickness is too small, undesirable slits will be formed in the web at the first stage of dope discharging. If the expected thickness is too large, the film becomes more likely to remain on the support. Therefore, it is desirable to preset the expected thickness in a range from 80 to 400 μm in terms of dried film thickness. In that case, the clearance between the die lips is generally 0.5 to 3 mm.

The clearance between the die lip tip and the support is preferably from 1 to 20 mm. This clearance is preferably reduced to a necessary distance after the start of casting, in order not to stain the lip tips.

The flow rate should be controlled at proper timings while calculating the time on the basis of a piping capacity from the three-way valve 33 to the feed block 11 and the flow rate. The time of lowering the flow rate is preferably 10 to 2 seconds before the start of discharging, but this is not limitative.

It is desirable to preset the support at a temperature before the dope discharging, where the film is easy to peel off. It is also desirable to dry the web by blowing it to an extent that would not disturb the discharge of the dope from the casting die. For example, where the web is cooled for gelatinizing, the support is preferably preset to have a surface temperature of −5 to 15° C., and more preferably 0 to 10° C. Then, the film will be almost completely peeled off the support, while the film is kept in tight contact with the support. Therefore, it is preferable to preset the surface temperature of the support at an appropriate value before the film-forming.

For the casting method where the film is peeled off after the solution is sufficiently dried, the surface temperature of the support is preferably set at 10 to 30° C. and more preferably 15 to 25° C. It is to be noted that the above mentioned temperature ranges of the support are defined on the assumption that the dope is a solution of triacetyl cellulose into methylene chloride. For another kind of solution, the temperature range of the support should be defined by experiments.

The airflow of the drying air is preferably reduced to 20 to 80%, more preferably 30 to 70%, of that used generally for manufacturing the articles. Then, the drying air will not disturb the soft web at the exit of the casting die. It is possible to feed the drying air since several hours before the start of discharging, or after the dope discharging. The drying temperature is usually set lower than the manufacturing condition for the articles. For example, if the manufacturing condition is 40° C. the drying temperature is set at 20 to 30° C. and 40 to 80° C. for 120° C. where as 50 to 90° C. for 140°C. But these values are not limitative.

Now numerical values and experimental results of examples 1 to 7 of the present invention and those of comparatives 1 to 3 will be shown as follows. But the present invention is not to be limited to these examples. These examples and comparatives will be described with respect to the pipe 26 for the intermediate layer, but the same applies to the other pipes 25 and 27.

EXAMPLES

The pipe 26 of the film casting apparatus 10 was formed from a transparent resin, so that the air collection 38 in the pipe 26 may be observed from outside by naked eyes.

The pipe 26 has an internal diameter of 40 to 150 mm, and more preferably 50 to 90 mm. In the examples and the comparatives, the internal diameter of the pipe 26 was set at 55 mm.

The solution density of the dope 28 was set at 1300 kg/m³, and the viscosity of the dope was set at 130 Pascal second. The numerical values and the experimental results of the examples and the comparatives are shown in Table 1, wherein "θ" indicates an inclination angle of the straight pipe portion 32, "R" indicates a radius of curvature of the goose neck portion 31, "T" indicates a time lag from the opening of the air vent valves to the start of dope discharging, "L/s" indicates a flow volume (litter per second) of the dope, and "m/s" indicates a flow velocity (meter per second) of the dope.

TABLE 1

| | θ (°) | R (mm) | T (sec.) | L/s | m/s | Reynolds number | Result |
|---|---|---|---|---|---|---|---|
| Example 1 | 0 | 50 | 136 | 3 | 1.3 | 0.012 | OK |
| Example 2 | 5 | 50 | 136 | 3 | 1.3 | 0.012 | OK |
| Example 3 | 10 | 50 | 136 | 3 | 1.3 | 0.012 | OK |
| Example 4 | 15 | 50 | 136 | 3 | 1.3 | 0.012 | OK |
| Example 5 | 20 | 50 | 136 | 3 | 1.3 | 0.012 | OK |
| Example 6 | 15 | 200 | 144 | 3 | 1.3 | 0.012 | OK |
| Example 7 | 15 | 400 | 159 | 3 | 1.3 | 0.012 | OK |
| Comparative 1 | 25 | 50 | 136 | 3 | 1.3 | 0.012 | NG |
| Comparative 2 | 25 | 50 | 205 | 2 | 0.8 | 0.008 | NG |
| Comparative 3 | 5 | 50 | 205 | 2 | 0.8 | 0.008 | NG |

In any of the examples 1 to 6, the air collection was not observed. In the example 7, the air collected a little in the radially outward area of the vertical portion of the goose neck portion, but it disappeared quickly. In the comparative 1, the air collected in the radially outward area of the vertical portion of the goose neck portion, through there was no air in the outlet of the straight pipe portion. In the comparative 2, there was the air in the outlet of the straight pipe portion. In the comparative 3, the air collected in the goose neck portion, through there was no air in the outlet of the straight pipe portion. As seen from Table 1, if the dope 28 flows at a speed of 1.3 m/second through the pipe 28 where the inclination angle θ of the straight pipe portion 32 is 5 to 15 degrees, the air collection 38 would not occur in the straight pipe portion 32.

It is also found that the air is more likely to stay in a vertical or downward portion of the pipe 26, particularly in radially outward area inside the goose neck portion 31, with an increase in the radius of curvature R of the goose neck portion 31. It has been found that the radius of curvature R may be set in a range from 50 to 200 mm with no problem, and the upper limit is 400 mm.

The present invention is not only applicable to a film casting apparatus, a protective film of a polarizing plate, and a polarizing plate, but may also be modified for the use in manufacturing a liquid crystal display.

What is claimed is:

1. A film casting method for forming a plastic film comprising the steps of:

supplying a resin solution continuously to a casting die with a solution supply pipe, said solution supply pipe comprising a gooseneck portion connected to said casting die and having a radius of curvature of 50 mm to 400 mm, and a straight portion connected to said gooseneck portion, said straight pipe portion having an angle of 0 to 20 degrees to a horizontal plane; and casting said resin solution from die lips of said casting die onto a support.

2. The film casting method as claimed in claim 1, wherein said gooseneck portion or said straight pipe portion is provided with an air vent valve, said supplying step including the steps of:

opening said air vent valve at the beginning of said resin solution feeding;

closing said air vent valve to some extent as said resin solution comes out from said air vent valve; and closing said air vent valve completely after the air is completely vented out.

3. The film casting method as claimed in claim 2, wherein said gooseneck portion or said straight pipe portion is provided with an air bubble sensor, and opening and closing of said air vent valve is automatically controlled based on an output of said air bubble sensor.

4. The film casting method as claimed in claim 3, wherein said resin solution is a cellulose ester solution.

* * * * *